United States Patent
Papasakellariou et al.

(10) Patent No.: US 9,147,193 B2
(45) Date of Patent: *Sep. 29, 2015

(54) METHOD FOR TRANSMISSION OF UNICAST CONTROL IN BROADCAST/MULTICAST TRANSMISSION TIME INTERVALS

(75) Inventors: Aris Papasakellariou, Dallas, TX (US); Timothy M. Schmidl, Dallas, TX (US); Eko N. Onggosanusi, Allen, TX (US); Anand Dabak, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/446,492

(22) Filed: Apr. 13, 2012

(65) Prior Publication Data

US 2012/0195246 A1 Aug. 2, 2012

Related U.S. Application Data

(63) Continuation of application No. 11/554,959, filed on Oct. 31, 2006, now Pat. No. 8,175,021.

(60) Provisional application No. 60/733,675, filed on Nov. 4, 2005.

(51) Int. Cl.
*H04J 3/00* (2006.01)
*G06Q 30/00* (2012.01)
(Continued)

(52) U.S. Cl.
CPC ............... *G06Q 30/00* (2013.01); *G06Q 20/10* (2013.01); *G06Q 40/00* (2013.01); *H04W 72/005* (2013.01);
(Continued)

(58) Field of Classification Search
CPC ............ H04W 72/005; H04W 76/002; H04W 74/006; H04W 72/00; H04W 24/02; H04W 28/06; H04W 72/04; H04W 72/0406; H04W 72/042; H04W 72/0453; H04W 72/1263; H04L 65/4076; H04N 21/6408; H04N 21/6405; H04N 21/6131; H04N 21/236; H04N 21/23614; H04J 11/0079; H04J 11/0046
USPC ......... 705/335; 455/450, 451, 42.1, 454, 464, 455/509, 515; 370/312, 328, 329, 330, 336, 370/347

See application file for complete search history.

(56) References Cited

U.S. PATENT DOCUMENTS 4,893,306 A * 1/1990 Chao et al. ............... 370/458
6,212,182 B1 * 4/2001 McKeown ................ 370/390
(Continued)

FOREIGN PATENT DOCUMENTS

EP 1255368 11/2002
EP 1289181 3/2003
(Continued)

OTHER PUBLICATIONS

Nakamura et al.; Adaptive Control of Link Adaptation for High Speed Downlink Packet Access (HSPDA) in W-CDMA; Fujitsu Laboratories of Europe Ltd., 0-7803-7442; Aug. 2002 IEEE.
(Continued)

*Primary Examiner* — Olumide T Ajibade Akonai
(74) *Attorney, Agent, or Firm* — Ronald O. Neerings; Frank D. Cimino (57) ABSTRACT

Embodiments of the invention provide methods for maximizing the bandwidth utilization in the uplink of a communication system supporting time division multiplexing between unicast and multicast/broadcast communication modes during transmission time intervals in the downlink of a communication system. This is accomplished by multiplexing at least unicast control signaling for UL scheduling assignments in TTIs supporting the multicast/broadcast communication mode. Moreover, multiplexing of unicast control signaling can also be accomplished by splitting a symbol of the multicast/broadcast TTI into two shorter symbols with the first of these two shorter symbols carrying at least unicast control signaling and the second of these shorter symbols carrying multicast/broadcast signaling.

18 Claims, 4 Drawing Sheets

(51) Int. Cl.
| | | |
|---|---|---|
| *H04W 72/00* | (2009.01) | |
| *G06Q 20/10* | (2012.01) | |
| *G06Q 40/00* | (2012.01) | |
| H04N 21/6405 | (2011.01) | |
| H04L 29/06 | (2006.01) | |
| H04W 72/04 | (2009.01) | |
| H04N 21/236 | (2011.01) | |
| H04N 21/6408 | (2011.01) | |
| H04N 21/61 | (2011.01) | |

(52) U.S. Cl.
CPC ....... *H04L 65/4076* (2013.01); *H04N 21/23614* (2013.01); *H04N 21/6131* (2013.01); *H04N 21/6405* (2013.01); *H04N 21/6408* (2013.01); *H04W 72/00* (2013.01); *H04W 72/0406* (2013.01)

(56) References Cited

U.S. PATENT DOCUMENTS

| | | | |
|---|---|---|---|
| 6,909,881 | B2 | 6/2005 | Uehara et al. |
| 7,382,781 | B1* | 6/2008 | Sridhar et al. ........... 370/395.21 |
| 2003/0081692 | A1 | 5/2003 | Kwan et al. |
| 2003/0220119 | A1 | 11/2003 | Terry |
| 2005/0041622 | A1 | 2/2005 | Dubuc et al. |
| 2005/0107036 | A1 | 5/2005 | Song et al. |
| 2005/0128976 | A1 | 6/2005 | Uehara et al. |
| 2005/0238108 | A1 | 10/2005 | Suh et al. |
| 2005/0259584 | A1* | 11/2005 | Chen et al. ................... 370/238 |
| 2005/0276317 | A1 | 12/2005 | Jeong et al. |
| 2006/0013168 | A1* | 1/2006 | Agrawal et al. ............... 370/335 |
| 2006/0039344 | A1* | 2/2006 | Khan ........................... 370/345 |
| 2006/0092875 | A1 | 5/2006 | Yang et al. |

FOREIGN PATENT DOCUMENTS

| | | |
|---|---|---|
| WO | WO03088545 | 10/2003 |
| WO | WO2005081439 | 9/2005 |
| WO | WO2006004968 | 1/2006 |

OTHER PUBLICATIONS

Amitava Shosh, Rapeepat Ratasuk, Colin Frank, Robert Love, Ken Steward, Eoin Buckley; Control Channel Design for High Speed Downlink Shared Channel for 3GPP W-CDMA, Rel-5; Motorola, GTSS; 0-7803-7757-5; Mar. 2003 IEEE.

Chang-Jun Ahn, Hiroshi Harada; Superimposed Frequency Symbol Based Adaptive Downlink OFDM with Frequency Spreading and Equalization; 2005 Asia-Pacific Conference on Communications, Perth, Western Australia; Oct. 3-5, 2005; 0-7803-9132-2; Feb. 2005 IEEE.

Tommy Svensson, Sorour Falahati, Mikael Sternad; Coding and Resource Scheduling in Packet Oriented Adaptive TDMA/OFDMA Systems; Dept. of Signals and Systems, UppsalaUniversity; 0-7803-9392-9; Sep. 2006 IEEE.

Nakanishi et al.; An OFDM Based Adaptive Modulation Scheme Employing Variable Coding Rate in Dynamic Parameter Controlled OF/TDMA Systems.

* cited by examiner

METHOD FOR TRANSMISSION OF UNICAST CONTROL IN BROADCAST/MULTICAST TRANSMISSION TIME INTERVALS

CROSS-REFERENCE TO RELATED APPLICATIONS

This application is a continuation and claims priority to and incorporates by reference U.S. application Ser. No. 11/554,959, filed Oct. 31, 2006 which in turn claims priority to and incorporates by reference U.S. Provisional Application No. 60/733,675, filed Nov. 4, 2005, entitled "Method for Transmission of Unicast Control/Data in Broadcast TTI's", Aris Papasakellariou, Timothy Schmidl, Eko Onggosanusi, Anand Dabak inventors.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Embodiments of the invention are directed, in general, to communication systems and, more specifically, to enabling unicast signaling from user equipments UEs to a serving base station BS during transmission time intervals that the base station transmits multicast/broadcast signaling to user equipments UEs.

The global market for both voice and data communication services continues to grow as does users of the systems which deliver those services. As communication systems evolve, system design has become increasingly demanding in relation to equipment and performance requirements. Future generations of communication systems, will be required to provide high quality high transmission rate data services in addition to high quality voice services. Orthogonal Frequency Division Multiplexing (OFDM) is a technique that will allow for high speed voice and data communication services.

Orthogonal Frequency Division Multiplexing (OFDM) is based on the well-known technique of Frequency Division Multiplexing (FDM). OFDM technique relies on the orthogonality properties of the fast Fourier transform (FFT) and the inverse fast Fourier transform (IFFT) to eliminate interference between carriers. At the transmitter, the precise setting of the carrier frequencies is performed by the IFFT. The data is encoded into constellation points by multiple (one for each carrier) constellation encoders. The complex values of the constellation encoder outputs are the inputs to the IFFT. For wireless transmission, the outputs of the IFFT are converted to an analog waveform, up-converted to a radio frequency, amplified, and transmitted. At the receiver, the reverse process is performed. The received signal (input signal) is amplified, down converted to a band suitable for analog to digital conversion, digitized, and processed by a FFT to recover the carriers. The multiple carriers are then demodulated in multiple constellation decoders (one for each carrier), recovering the original data. Since an IFFT is used to combine the carriers at the transmitter and a corresponding FFT is used to separate the carriers at the receiver, the process has potentially zero inter-carrier interference such as when the sub-carriers are separated in frequency by an amount larger than the maximum expected Doppler shift.

Figure 1:
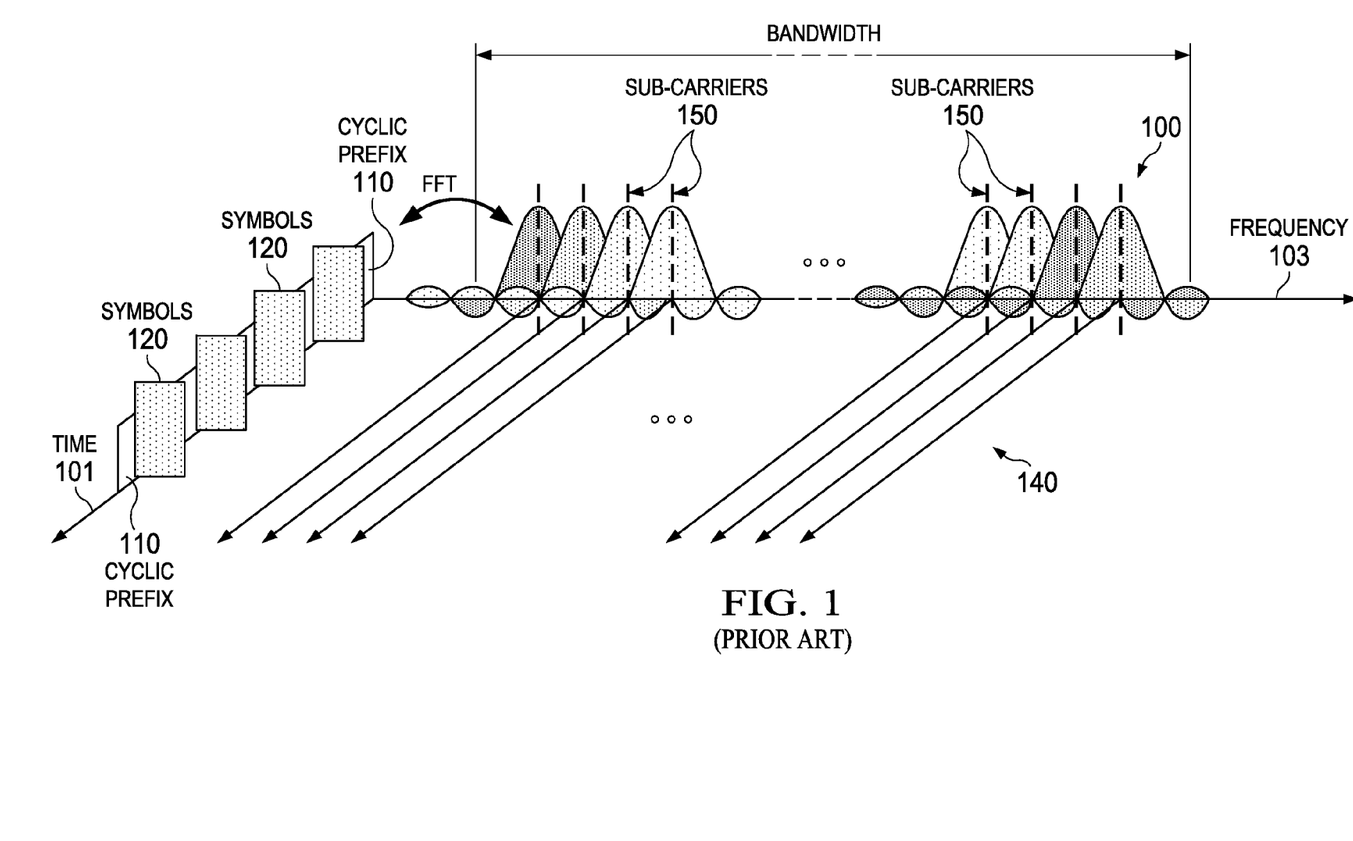
- FIG. 1 is a diagram illustrative of the Frequency-Time Representation of an OFDM Signal.

FIG. 1 is a diagram illustrative of the Frequency 103-Time 101 Representation 100 of an OFDM Signal. In FDM different streams of information are mapped onto separate parallel frequency channels 140. Each FDM channel is separated from the others by a frequency guard band to reduce interference between adjacent channels.

The OFDM technique differs from traditional FDM in the following interrelated ways:
1. multiple carriers (called sub-carriers 150) carry the information stream;
2. the sub-carriers 150 are orthogonal to each other; and
3. a Cyclic Prefix (CP) 110 (also known as guard interval) is added to each symbol 120 to combat the channel delay spread and avoid OFDM inter-symbol interference (ISI).

The data/information carried by each sub-carrier 150 may be user data of many forms, including text, voice, video, and the like. In addition, the data includes control data, a particular type of which is discussed below. As a result of the orthogonality, ideally each receiving element tuned to a given sub-carrier does not perceive any of the signals communicated at any other of the sub-carriers. Given this aspect, various benefits arise. For example, OFDM is able to use orthogonal sub-carriers and, as a result, thorough use is made of the overall OFDM spectrum. As another example, in many wireless systems, the same transmitted signal arrives at the receiver at different times having traveled different lengths due to reflections in the channel between the transmitter and receiver. Each different arrival of the same originally-transmitted signal is typically referred to as a multi-path. Typically, multi-paths interfere with one another, which is sometimes referred to as InterSymbol Interference (ISI) because each path includes transmitted data referred to as symbols. Nonetheless, the orthogonality implemented by OFDM with a CP considerably reduces or eliminates ISI and, as a result, often a less complex receiver structure, such as one without an equalizer (one-tap "equalizer" is used), may be implemented in an OFDM system.

Figure 2:
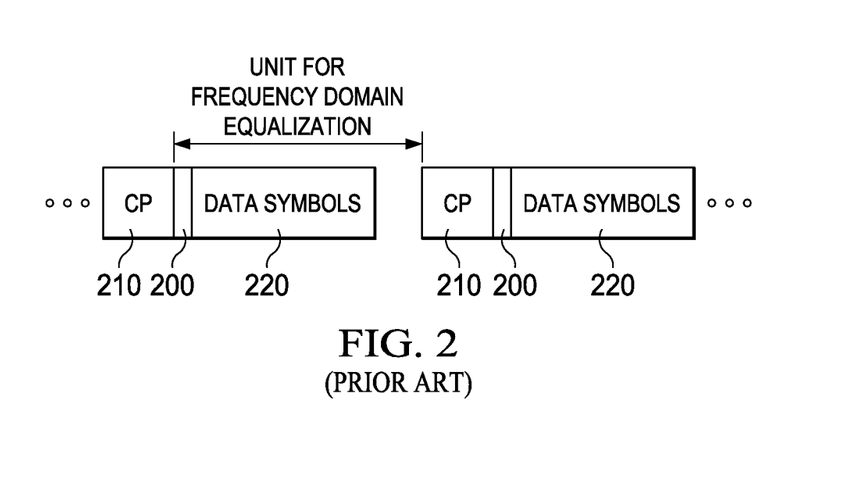
FIG. 2 is a diagram illustrative of using cyclic prefix (CP) to eliminate ISI and perform frequency domain equalization.

The Cyclic Prefix (CP) (also referred to as guard interval) is added to each symbol to combat the channel delay spread and avoid ISI. FIG. 2 is a diagram illustrative of using CP to eliminate ISI and perform frequency domain equalization. Blocks 200 each comprising cyclic prefix (CP) 210 coupled to data symbols 220 to perform frequency domain equalization. OFDM typically allows the application of simple, 1-tap, frequency domain equalization (FDE) through the use of a CP 210 at every FFT processing block 200 to suppress multi-path interference. Two blocks are shown for drawing convenience. CP 210 eliminates inter-data-block interference and multi-access interference using Frequency Division Multiple Access (FDMA).

Since orthogonality is typically guaranteed between overlapping sub-carriers and between consecutive OFDM symbols in the presence of time/frequency dispersive channels, the data symbol density in the time-frequency plane can be maximized and high data rates can be very efficiently achieved for high Signal-to-Interference and Noise Ratios (SINR).

Figure 3:
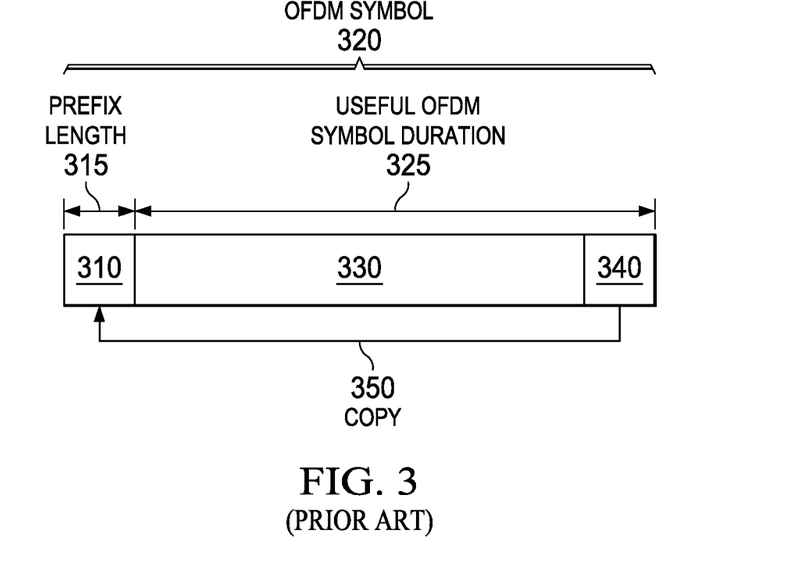
FIG. 3 is a diagram illustrative of Cyclic Prefix (CP) Insertion

FIG. 3 is a diagram illustrative of CP Insertion. A number of samples is typically inserted between useful OFDM symbols 320 (guard interval) to combat OFDM ISI induced by channel dispersion, assist receiver synchronization, and aid spectral shaping. The guard interval 310 is typically a prefix that is inserted 350 at the beginning of the useful OFDM symbol (OFDM symbol without the CP) 320. The CP duration 315 should be sufficient to cover most of the delay-spread energy of a radio channel impulse response. It should also be as small as possible since it represents overhead and reduces OFDM efficiency. Prefix 310 is generated using a last block of samples 340 from the useful OFDM symbol 330 and is therefore a cyclic extension to the OFDM symbol (cyclic prefix).

When the channel delay spread exceeds the CP duration 315, the energy contained in the ISI should be much smaller than the useful OFDM symbol energy and therefore, the OFDM symbol duration 325 should be much larger than the channel delay spread. However, the OFDM symbol duration 325 should be smaller than the minimum channel coherence time in order to maintain the OFDM ability to combat fast temporal fading. Otherwise, the channel may not always be constant over the OFDM symbol and this may result in inter-sub-carrier orthogonality loss in fast fading channels. Since the channel coherence time is inversely proportional to the maximum Doppler shift (time-frequency duality), this implies that the symbol duration should be much smaller than the inverse of the maximum Doppler shift.

The large number of OFDM sub-carriers makes the bandwidth of individual sub-carriers small relative to the total signal bandwidth. With an adequate number of sub-carriers, the inter-carrier spacing is much narrower than the channel coherence bandwidth. Since the channel coherence bandwidth is inversely proportional to the channel delay spread, the sub-carrier separation is generally designed to be much smaller that the inverse of the channel coherence time. Then, the fading on each sub-carrier appears flat in frequency and this enables 1-tap frequency equalization, use of high order modulation, and effective utilization of multiple transmitter and receiver antenna techniques such as Multiple Input/Multiple Output (MIMO). Therefore, OFDM effectively converts a frequency-selective channel into a parallel collection of frequency flat sub-channels and enables a very simple receiver. Moreover, in order to combat Doppler effects, the inter-carrier spacing should be much larger than the maximum Doppler shift.

By assigning transmission to various simultaneously scheduled UEs in different RBs, the Node B scheduler can provide intra-cell orthogonality among the various transmitted signals. Moreover, for each individual signal, the presence of the cyclic prefix provides protection from multipath propagation and maintains in this manner the signal orthogonality.

Each scheduled UE is informed of the scheduling assignment through the downlink (DL) control channel. The scheduling assignment can be for a signal transmission from the Node B and reception by a UE (downlink scheduling assignment) or for a signal transmission from the UE and reception at the Node B (uplink scheduling assignment). The control channel typically carries the scheduled UE identities (IDs), RB assignment information, the MCS used to transmit the data, the transport block size, and hybrid ARQ (HARQ) information relating to possible data packet re-transmissions. The control channel may optionally carry additional information such as for a multi-input multi-output (MIMO) transmission scheme. A scheduling assignment may relate either to data transmission from the Node B to a UE (downlink of a communication system) or to data transmission from a UE to the Node B (uplink of a communication system).

DL communication may involve dedicated communication from one or more serving Node Bs to multiple UEs in a unicast mode. This mode implies that the transmitted data signal carries information that is specific to a single UE. DL communication may also involve multicast/broadcast communication from one or more serving Node Bs to multiple UEs in a multicast/broadcast mode. This mode implies that the transmitted data signal carries information that is intended to multiple UEs (common information data content). For example, a unicast transmission may be a file download by a UE while broadcast/multicast transmission may be the broadcasting of news.

When the available communication bandwidth is not excessively large, a preferable method to multiplex the unicast and multicast/broadcast modes of communication is through time division multiplexing (TDM). With TDM, unicast communication exists during certain transmission time intervals (TTIs) of a frame while multicast/broadcast communication may commence during the remaining TTIs.

In TTIs supporting the multicast/broadcast mode, no unicast communication exists in the DL. However, it is still possible to transmit unicast data and associated control signaling in the uplink (UL) of the communication system. Otherwise, substantial bandwidth resources can be wasted in the UL.

To enable scheduling of data transmissions in the UL, a corresponding control channel carrying the respective scheduling assignments for unicast communication needs to be transmitted during multicast/broadcast TTIs.

Thus, there is a need to maximize the spectrum use in the uplink of a communication system employing time division multiplexing of unicast and multicast/broadcast communication modes in the downlink.

There is another need to multiplex unicast control signalling for scheduling assignments of uplink data signal transmissions in TTIs supporting the multicast/broadcast communication mode.

There is another need to minimize the overhead of unicast control signalling in TTIs supporting the multicast/broadcast communication mode.

SUMMARY

Embodiments of the invention provide a method to maximize the bandwidth utilization in the uplink (UL) of a communication system supporting time division multiplexing (TDM) between unicast and multicast/broadcast communication modes during transmission time intervals (TTIs) in the downlink (DL) of a communication system. This is accomplished by multiplexing at least unicast control signaling for UL scheduling assignments in TTIs supporting the multicast/broadcast communication mode.

As the unicast control signaling for UL scheduling assignments constitutes overhead in TTIs supporting the multicast/broadcast communication mode, the overall signaling related to this overhead needs to be minimized. This minimization primarily concerns the transmission of pilot signals (or reference signals) associated with the demodulation of the unicast control signaling at user equipments (UEs).

The multicast/broadcast TTI is assumed to comprise of symbols. Multiplexing of unicast control signaling can also be accomplished by splitting a symbol of the multicast/broadcast TTI into two shorter symbols with the first of these two shorter symbols carrying at least unicast control signaling and the second of these two shorter symbols carrying multicast/broadcast signaling.

These and other features and advantages will be more clearly understood from the following detailed description taken in conjunction with the accompanying drawings and claims.

BRIEF DESCRIPTION OF THE DRAWINGS

For a more complete understanding of the disclosure and the advantages thereof, reference is now made to the follow

DETAILED DESCRIPTION

It should be understood at the outset that although an exemplary implementation of one embodiment of the disclosure is illustrated below, the system may be implemented using any number of techniques, whether currently known or in existence. The disclosure should in no way be limited to the exemplary implementations, drawings, and techniques illustrated below, including the exemplary design and implementation illustrated and described herein, but may be modified within the scope of the appended claims along with their full scope of equivalents.

Embodiments of the invention address the problem of optimum utilization of the frequency spectrum available for uplink (UL) data packet transmissions in OFDMA-based networks, including variants of the OFDMA transmission method such as the single-carrier FDMA (SC-FDMA) transmission method, supporting time division multiplexing (TDM) between unicast and multicast/broadcast communication modes. The unicast communication mode refers to dedicated communication from one or more base stations (also referred to as Node Bs) to a single user equipment (UE) or the reverse (dedicated communication from a UE to one or more Node Bs). The multicast/broadcast communication mode refers to communication from one or more Node Bs to potentially and typically multiple UEs. In the preferred embodiment of the invention, DL control signalling providing scheduling assignments to UEs for UL data transmissions during multicast/broadcast TTIs (unicast control) is multiplexed in these TTIs.

Embodiments of the invention also address the minimization of the overhead associated with the multiplexing of unicast control in multicast/broadcast TTIs. As unicast control is assumed to be already optimized for spectral efficiency, the minimization concerns the optimum multiplexing method in order to minimize the signaling overhead associated with the demodulation of unicast control signaling at UEs. In particular this signaling overhead refers to the required unicast pilot (reference) signals.

Figure 4:
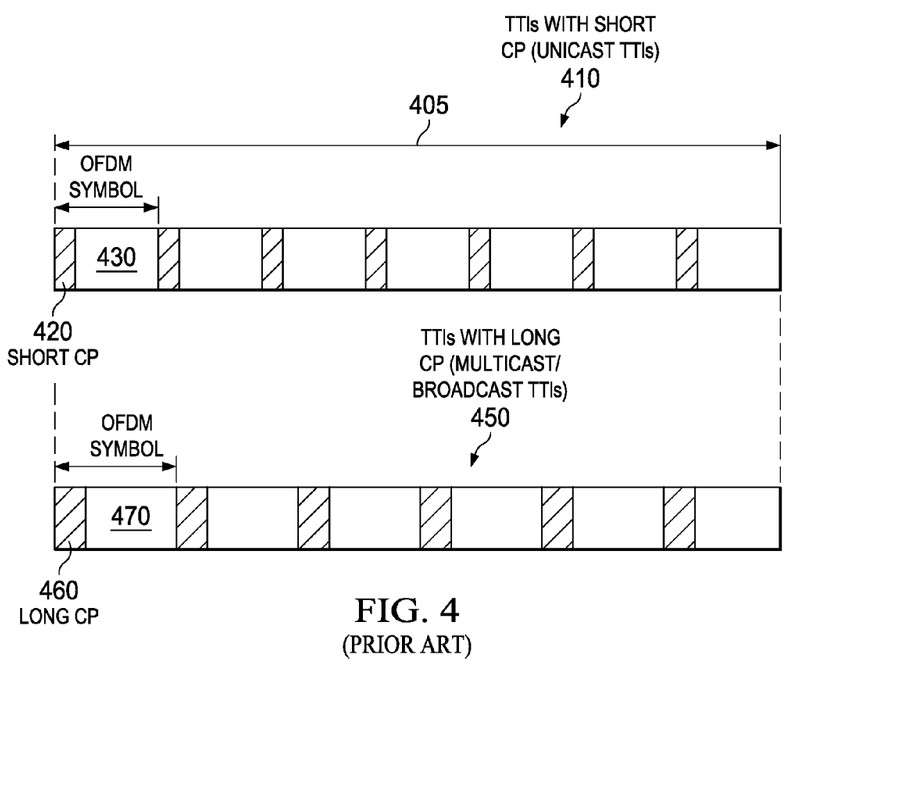
FIG. 4 is a diagram illustrative of unicast and multicast/broadcast transmission time intervals (TTIs)

FIG. 4 shows an exemplary structure of a unicast and broadcast/multicast transmission time interval (TTI) having the same duration 405. The unicast TTI 410, has a "short" cyclic prefix (CP) 420 and comprises of seven OFDM symbols 430. The multicast/broadcast TTI 450, has a "long" CP 460 and comprises of six OFDM symbols 470. Because unicast transmissions are associated with communication between a UE and one or very few Node Bs, the propagation delay and multi-path delay spread are typically much smaller than the corresponding ones for multicast/broadcast transmissions for which the same signal is transmitted by multiple Node Bs which may have substantial geographic separation. For this reason, unicast OFDM symbols are associated with a shorter CP and a shorter duration than multicast/broadcast OFDM symbols. Nevertheless, the invention does not preclude unicast communications in very large cells where the aforementioned delays are similar to those experienced by multicast/broadcast communications. Then, the two CPs may have similar or even the same value in which case the number of OFDM symbols is the same for both unicast and multicast/broadcast communication modes (not shown).

Figure 5:
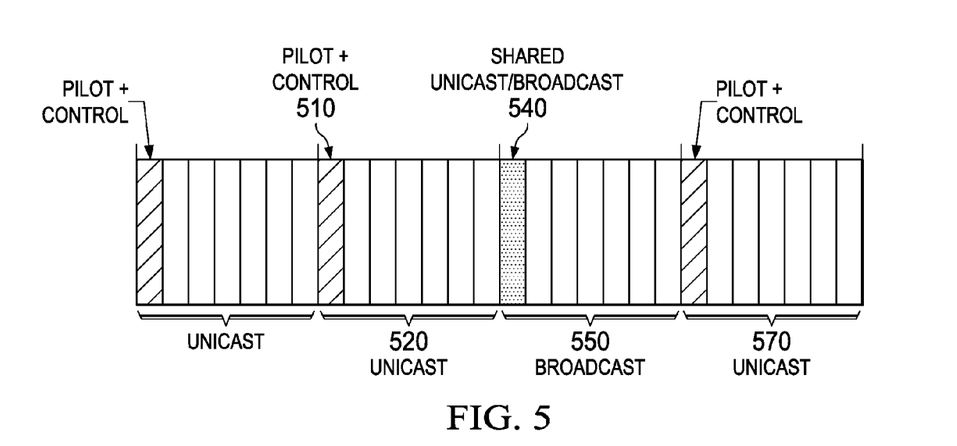
FIG. 5 is a diagram illustrative of shared unicast and multicast/broadcast multiplexing in the first OFDM symbol of a multicast/broadcast transmission time interval (TTI)

FIG. 5 shows one embodiment of the invention for the multiplexing of unicast control signaling in a multicast/broadcast TTI in the DL of a communication system. TDM is assumed for the unicast and multicast/broadcast TTIs. Part of the unicast control information and a pilot signal (also known as reference signal) 510 associated with a unicast TTI 520, are multiplexed with broadcast signaling 540 in the first OFDM symbol of the multicast/broadcast TTI 550. The unicast control information is typically associated with scheduling assignments related to both transmissions from a serving Node B to UEs (DL scheduling assignments) and to a serving Node B from UEs (UL scheduling assignments). Since only UL scheduling assignments are assumed possible during multicast/broadcast TTIs, only the corresponding unicast control signaling is multiplexed in a multicast/broadcast TTI. For the remaining of this invention, the multiplexing of unicast control signaling in multicast/broadcast TTIs will refer exclusively to UL scheduling assignments for unicast UL transmissions from UEs (that is, DL scheduling assignments or other control information for unicast DL communication are not included). It should be noted that, in addition to scheduling assignments, the UL unicast control may also provide the UEs timing control and power control information in order for the UEs to perform respective time adjustments and power adjustments to the corresponding UL signal transmissions.

In addition to the UL scheduling assignments, unicast pilots may also have to be multiplexed in order to ensure sufficiently reliable channel estimation for the demodulation of the unicast control channel in multicast/broadcast TTIs. Alternatively, if unicast pilots in the unicast TTI 520 are placed in the latter OFDM symbols of that TTI, their time separation from the first OFDM symbol of the multicast/broadcast TTI 550 may be small enough to provide for sufficiently accurate channel estimation even at very high UE velocities, thereby not necessitating the inclusion of unicast pilots in the first symbol of the multicast/broadcast TTI. Notice however that this may imply the inclusion of unicast pilots at a later OFDM symbol of the multicast/broadcast TTI to facilitate channel estimation in the ensuing unicast TTI 570.

The multicast/broadcast signaling 540 may include broadcast pilots, broadcast control, or broadcast data. It may be possible to multiplex both unicast control, and probably unicast pilots, with broadcast signaling in the same OFDM symbol of a multicast/broadcast TTI if the maximum possible size of unicast control is smaller than the corresponding number of sub-carriers in that OFDM symbol. Obviously, in order for unicast pilots to be also accommodated, the unicast control information should be substantially smaller than the aforementioned number of sub-carriers, which may imply that only a small number of UEs can receive UL scheduling assignments.

Figure 6:
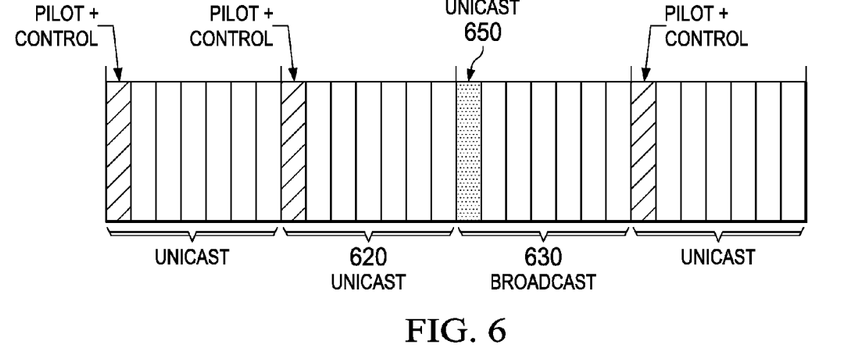
FIG. 6 is a diagram illustrative of unicast multiplexing in the first OFDM symbol of a multicast/broadcast transmission time interval (TTI)

If the unicast control signaling is too large to allow additional multiplexing of multicast/broadcast signaling in the same OFDM symbol of a multicast/broadcast TTI, only unicast signaling may occupy that OFDM symbol. The unicast signaling includes unicast control and can also include unicast pilots. This is depicted in FIG. 6. TDM is again assumed between unicast TTIs 620 and multicast TTIs 630. In this embodiment of the invention, the first OFDM symbol of the multicast/broadcast TTI contains only unicast signaling 650 (unicast control and probably unicast pilots) and does not contain any broadcast signaling.

Figure 7:
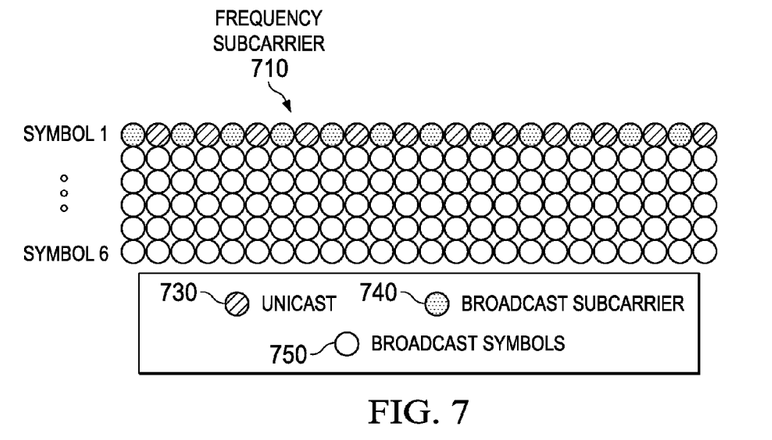
FIG. 7 shows unicast and multicast/broadcast sub-carrier multiplexing in the first OFDM symbol of a multicast/broadcast transmission time interval (TTI)

FIG. 7 provides a more detailed depiction of the shared unicast and multicast/broadcast multiplexing 540. The available frequency sub-carriers 710 in the first OFDM symbol of the multicast/broadcast TTI are partitioned into unicast sub-carriers 730 and multicast/broadcast sub-carriers 740. The remaining of the multicast/broadcast TTI is assumed to be assigned to multicast/broadcast symbols 750. The unicast sub-carriers may include unicast control sub-carriers (for example, two out of three unicast sub-carriers) and unicast pilot sub-carriers (for example, one out of three unicast sub-carriers). Alternatively, the unicast sub-carriers may exclusively carry unicast control. As previously mentioned, the multicast/broadcast sub-carriers may carry corresponding control, pilot, or data signaling.

Figure 8:
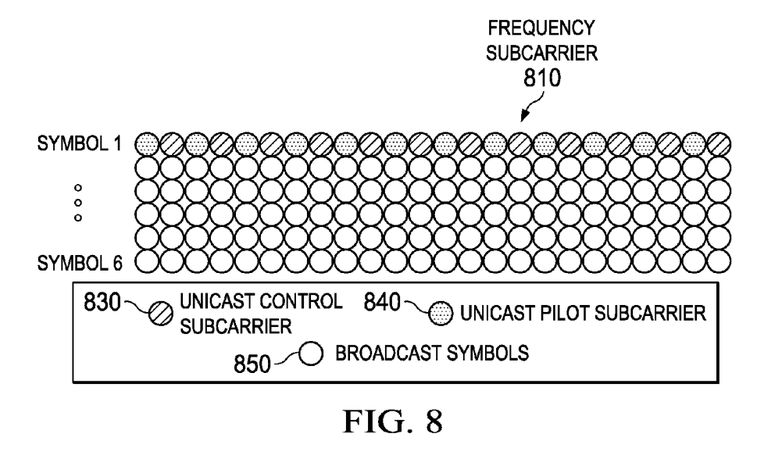
FIG. 8 shows sub-carrier multiplexing of unicast signals in the first OFDM symbol of a multicast/broadcast transmission time interval (TTI).

FIG. 8 provides a more detailed depiction of the unicast multiplexing 650. The available frequency sub-carriers 810 in the first OFDM symbol of the multicast/broadcast TTI are partitioned into unicast control sub-carriers 830 and unicast pilot sub-carriers 840. The remaining of the multicast/broadcast TTI is assumed to be assigned to multicast/broadcast symbols 850.

As shown in FIGS. 5-8, the preferred embodiment considers that the unicast control is multiplexed in the first OFDM symbol of the multicast/broadcast TTI. Moreover, additional symbols at the beginning of the multicast/broadcast TTI may be used, especially if the multicast/unicast TTI comprises of more than the six OFDM symbols shown in FIGS. 5-8 and in FIG. 4. For example, for a multicast/broadcast TTI comprising of 12 OFDM symbols, unicast control may be spread over the first six OFDM symbols. In general, having unicast control signaling transmitted at the beginning of the multicast/broadcast TTIs simply means that the unicast control signaling terminates prior to the termination of a multicast/broadcast TTI.

There are multiple reasons for the transmission of the unicast control in the multicast/broadcast TTI with minimum latency and with priority to the multicast/broadcast signal transmission.

One reason is that UL scheduling assignments may be based on channel quality indicators (CQI) provided by UEs to the Node B scheduler several TTIs before a reference multicast/unicast TTI. The CQI for UL scheduling of a UE is typically implicitly provided to the Node B through the transmission by that UE of a pilot signal occupying the entire scheduling bandwidth. The Node B computes the UL channel the signal transmission from that UE will experience based on the previous pilot signal.

The larger the latency in receiving the UL scheduling assignments through the unicast control, the later the UL data transmission will be, and the more inaccurate the CQI on which the Node B scheduling was based will become relative to the actual channel the signal transmitted from a UE with an UL scheduling assignment will experience. Such inaccuracies (mismatches) between the UL channel indicated by the CQI for the Node B to perform UL scheduling and the actual UL channel experienced during the signal transmission can cause significant degradation in the achievable throughput. Therefore, the unicast control channel should be multiplexed in multicast/broadcast TTIs so that it can be received with minimum latency. This implies transmission of unicast control in the beginning of the multicast/broadcast TTI.

Another reason for multiplexing the unicast control in the beginning of a multicast/broadcast TTI is to minimize the unicast pilot overhead for the demodulation of that unicast control. If the unicast control was distributed throughout the multicast/broadcast TTI, then multiple unicast pilots would also be required to be distributed throughout that TTI, thereby increasing the corresponding unicast pilot overhead. This is because, especially at very high UE velocities, time interpolation between unicast pilots located at various OFDM symbols of the multicast/broadcast TTI may not be possible.

Another reason for multiplexing the unicast control in the beginning of a multicast/broadcast TTI is to minimize buffering and latency requirements at the UE receiver for processing the unicast control.

Another reason for multiplexing the unicast control in the beginning of a multicast/broadcast TTI is to enable a "micro-sleep" mode for UEs. With micro-sleep, UEs that did not receive an UL scheduling assignment during the multicast/broadcast TTI, and do not receive multicast/broadcast information, may shut down parts of their transmitter and receiver chains and turn them back on again in time to receive the next TTI and its control information. This can enable UEs to be more power efficient due to the associated power savings.

In addition to multiplexing unicast control and possibly unicast pilot in the first OFDM symbols of a multicast/broadcast TTI, this first OFDM symbol may instead be split into two (shorter) OFDM symbols. For example, each of these two OFDM symbols may having half the duration of the original OFDM symbol with the first of these two symbols exclusively carrying unicast signals and the second exclusively carrying multicast signals. Although more transparent, this option has the slight disadvantage of increasing the CP overhead as an additional unicast (short) CP is required but it may decrease the overall unicast overhead in multicast/broadcast TTIs. For example, a 1024 point IFFT is used to form multicast/broadcast OFDM symbols, then a 512 point FFT could be used for the OFDM symbol carrying unicast signals.

While several embodiments have been provided in the disclosure, it should be understood that the disclosed systems and methods may be embodied in many other specific forms without departing from the spirit or scope of the disclosure. The examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method to schedule a data transmission from a User Equipment (UE) wherein said scheduling occurs in a multicast/broadcast Transmission Time Interval (TTI), said method comprising:
receiving at the UE multicast/broadcast data in a multicast/broadcast transmission time interval (TTI), wherein unicast signaling is multiplexed with said multicast/broadcast data, and wherein said unicast signaling comprises only unicast control signaling and unicast pilot signaling; and
transmitting from said UE unicast data signaling in a TTI in response to the reception of said unicast control signaling in said multicast/broadcast TTI.

2. The method of claim 1, wherein said unicast control signaling provides scheduling assignments for data signal transmission.

3. The method of claim 1, wherein said unicast control signaling provides timing control or power control information.

4. The method of claim 3, wherein said UE adjusts its signal transmission power or its signal transmission timing in response to said timing control or power control information, respectively.

5. The method of claim 1, wherein said unicast pilot signaling is transmitted with priority to multicast/broadcast signaling at the beginning of said multicast/broadcast TTI.

6. The method of claim 1, wherein said multicast/broadcast TTI comprises of symbols and said unicast control signaling is multiplexed with multicast broadcast signaling in the same symbol.

7. The method of claim 1, wherein said multicast/broadcast TTI comprises of symbols and said unicast control signaling and multicast broadcast signaling are multiplexed in different symbols.

8. The method of claim 1, wherein said communication system employs the OFDMA transmission method.

9. A User Equipment (UE) configured to schedule a data transmission wherein said scheduling occurs in a multicasti broadcast Transmission Time Interval (TTI), said UE including:
a receiver configured to receive multicast/broadcast data in a multicast/broadcast transmission time interval (TTI), wherein unicast signaling is multiplexed with said multicast/broadcast data, and wherein said unicast signaling comprises only unicast control signaling and unicast pilot signaling; and
a transmitter configured to send unicast data signaling in a TTI in response to said received unicast control signaling in said multicast/broadcast TTI.

10. The UE of claim 9, wherein said unicast control signaling provides scheduling assignments for data signal transmission.

11. The UE of claim 9, wherein said unicast control signaling provides timing control or power control information.

12. The UE of claim 11, wherein said UE adjusts its signal transmission power or its signal transmission timing in response to said timing control or power control information, respectively.

13. The UE of claim 9, wherein said unicast pilot signaling is transmitted with priority to multicast/broadcast signaling at the beginning of said multicastibroadcast TTI.

14. The UE of claim 9, wherein said multicast/broadcast TTI comprises of symbols and said unicast control signaling is multiplexed with multicast/broadcast signaling in the same symbol.

15. The UE of claim 9, wherein said multicast/broadcast TTI comprises of symbols and said unicast control signaling and multicast/broadcast signaling are multiplexed in different symbols.

16. The UE of claim 9, wherein said communication system employs the OFDMA transmission method.

17. A method, comprising:
receiving at a UE multicast/broadcast data in a multicast/broadcast transmission time interval (TTI), wherein unicast signaling is multiplexed with said multicast/broadcast data, and wherein said unicast signaling comprises only unicast control signaling and unicast pilot signaling; and
transmitting from said UE unicast data signaling in a TTI in response to the reception of said unicast control signaling in said multicast/broadcast TTI.

18. An apparatus, comprising:
a receiver configured to receive multicast/broadcast data in a multicast/broadcast transmission time interval (TTI), wherein unicast signaling is multiplexed with said multicast/broadcast data, and wherein said unicast signaling comprises only unicast control signaling and unicast pilot signaling; and
a transmitter configured to send unicast data signaling in a TTI in response to said received unicast control signaling in said multicast/broadcast TTI.

* * * * *